United States Patent
Kakui et al.

(10) Patent No.: US 6,804,046 B2
(45) Date of Patent: Oct. 12, 2004

(54) OPTICAL AMPLIFICATION FIBER, FIBER OPTIC AMPLIFIER, AND OPTICAL COMMUNICATION SYSTEM

(75) Inventors: Motoki Kakui, Yokohama (JP); Masahiro Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/969,808

(22) Filed: Oct. 4, 2001

(65) Prior Publication Data

US 2002/0057490 A1 May 16, 2002

Related U.S. Application Data

(60) Provisional application No. 60/297,515, filed on Jun. 13, 2001.

(30) Foreign Application Priority Data

Nov. 15, 2000 (JP) .................................... P2000-348422

(51) Int. Cl.[7] ................................................ H01S 3/00
(52) U.S. Cl. .................................................. 359/341.1
(58) Field of Search ............................ 359/341.1, 341.5

(56) References Cited

U.S. PATENT DOCUMENTS 6,175,445 B1 * 1/2001 Desthieux et al. ....... 359/341.5

OTHER PUBLICATIONS

Sumitomo Electric Industries, Ltd. http://www.sumitomo.com. published Sep. 1999.*

Wave Optics. http://www.waveoptics.com/assets/images/ampfibers.pdf.published Jul. 9, 2000.*

Thorlabs. http://www.thorlabs.com. published Mar. 3, 2001.*

"Erbium–Doped Fiber, High–Performance Fibers for EDFA and ASE Source Applications", Lucent Tehnologies, Bell Labs Innovations.

* cited by examiner

Primary Examiner—Thomas H. Hughes
Assistant Examiner—Deandra M. Hughes
(74) Attorney, Agent, or Firm—McDermott Will & Emery LLP

(57) ABSTRACT

This invention relates to an optical amplification fiber having a structure capable of exhibiting an excellent amplification characteristics, and the like. In the optical amplification fiber, the ratio ($\alpha_P/\alpha_S$) of an unsaturated absorption peak value $\alpha_P$ in a pumping light wavelength band of 0.98 μm to an unsaturated absorption peak value $\alpha_S$ in a signal wavelength band of 1.55 μm is 0.8 or more and, more preferably, 0.9 or more.

13 Claims, 8 Drawing Sheets

| EDF TYPE | A | B | C | D | E | F | G | H |
|---|---|---|---|---|---|---|---|---|
| MODE FIELD DIAMETER AT1.53μm(μm) | 5.0~6.5 | | | 5.0 | | | 5.5 | 5.5 |
| MODE FIELD DIAMETER AT0.98μm(μm) | 3.4 | | | 2.4~3.4 | | | 3.4 | 3.4 |
| Er-DOPED REGION OUTER DIAMETER(μm) | 1.6 | 2.0 | 2.4 | 1.6 | 2.0 | 2.4 | 2.4 | 2.4 |
| Er CONCENTRATION (m-3) | $1.73 \times 10^{25}$ | | | | | | | |

OPTICAL AMPLIFICATION FIBER, FIBER OPTIC AMPLIFIER, AND OPTICAL COMMUNICATION SYSTEM

CROSS-REFERENCE TO RELATED APPLICATION

This application claims priority to Provisional Application Ser. No. 60/297,515 filed on Jun. 13, 2001, which is/are hereby incorporated by reference in its/their entirety.

BACKGROUND OF THE INVENTION

1. Field of the Invention

The present invention relates to an optical amplification fiber for amplifying a signal, a fiber optic amplifier including the optical amplification fiber, and an optical communication system including the fiber optic amplifier.

2. Related Background Art

Along with recent proliferation of the Internet, demands for communication capacities are rapidly increasing. In particular, a transoceanic optical communication system that connects continents is mainly used for international communication which requires a large capacity, and its communication distance is as long as several thousand kilometers. In such a long-haul optical communication system, a fiber optic amplifier is indispensable. A fiber optic amplifier includes an optical amplification fiber having a light propagating region doped with a rare earth element. When pumping light is supplied to the optical amplification fiber, signals can be amplified. For example, generally, the rare earth element is Er, the pumping light wavelength is 0.98- or 1.48-$\mu$m band, and the signal wavelength is a 1.55-$\mu$m band.

SUMMARY OF THE INVENTION

The present inventors examined the above-described prior art and found the following problem. There are many technical difficulties for a fiber optic amplifier to sufficiently exhibit its performance in a long-haul optical communication system. That is, an increase in output power of amplified signals simultaneously causes an increase in noise figure (NF), through the noise figure of the entire transmission medium such as an optical amplification fiber through which light in the signal wavelength band and light in a pumping light wavelength band different from the signal wavelength band simultaneously propagate cannot be predicted. The conventional fiber optic amplifier does not sufficiently exhibit its amplification performance and, more particularly, performance related to the noise figure NF, and therefore, the performance of the optical communication system is not sufficient, either.

The present invention has been made to solve the above-described problem, and has as its object to provide an optical amplification fiber having a structure capable of exhibiting an excellent amplification characteristic, a fiber optic amplifier including the optical amplification fiber, and an optical communication system including the fiber optic amplifier.

An optical amplification fiber according to the present invention is an optical amplification fiber having a light propagating region whose at least part is doped with a rare earth element, and being capable of amplifying signals by using supplied pumping light. The optical amplification fiber has a structure for reducing the noise figure NF by unbalancing a mode field diameter for pumping light having a wavelength of 0.98 $\mu$m (975 to 985 nm) and a mode field diameter for signals having a wavelength of 1.55 $\mu$m (1,525 to 1,565 nm) and also has a structure for suppressing the noise figure NF to an appropriate value in a transmission medium through which these light components in different wavelength bands simultaneously propagate. That is, in the optical amplification fiber according to the present invention, the ratio ($\alpha_P/\alpha_S$) of an unsaturated absorption peak value $\alpha_P$ in a pumping light wavelength band of 0.98 $\mu$m to an unsaturated absorption peak value $\alpha_S$ in a signal wavelength band of 1.55 $\mu$m is controlled to be 0.8 or more and, more preferably, 0.9 or more. In the optical amplification fiber according to the present invention, the rare earth element is added into the light propagating region of the optical amplification fiber such that its concentration increases toward the optical axis of the optical amplification fiber.

A fiber optic amplifier according to the present invention comprises an optical amplification fiber having the above-described structure (an optical amplification fiber according to the present invention), and a pumping light source for supplying the pumping light to the optical amplification fiber.

An optical communication system according to the present invention is a WDM (Wavelength Division Multiplexing) system having a transmission medium for propagating multiplexed signals of a plurality of channels with different wavelengths, which includes the above fiber optic amplifier (a fiber optic amplifier according to the present invention) capable of amplifying these WDM signals.

In the fiber optic amplifier including the optical amplification fiber with the above-described structure, the noise figure NF is suppressed to 0.4 dB or less, and an excellent amplification characteristic can be exhibited. In the optical communication system including the fiber optic amplifier with the above-described structure, WDM signals can be transmitted through a long haul at a high bit rate without any reception error.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
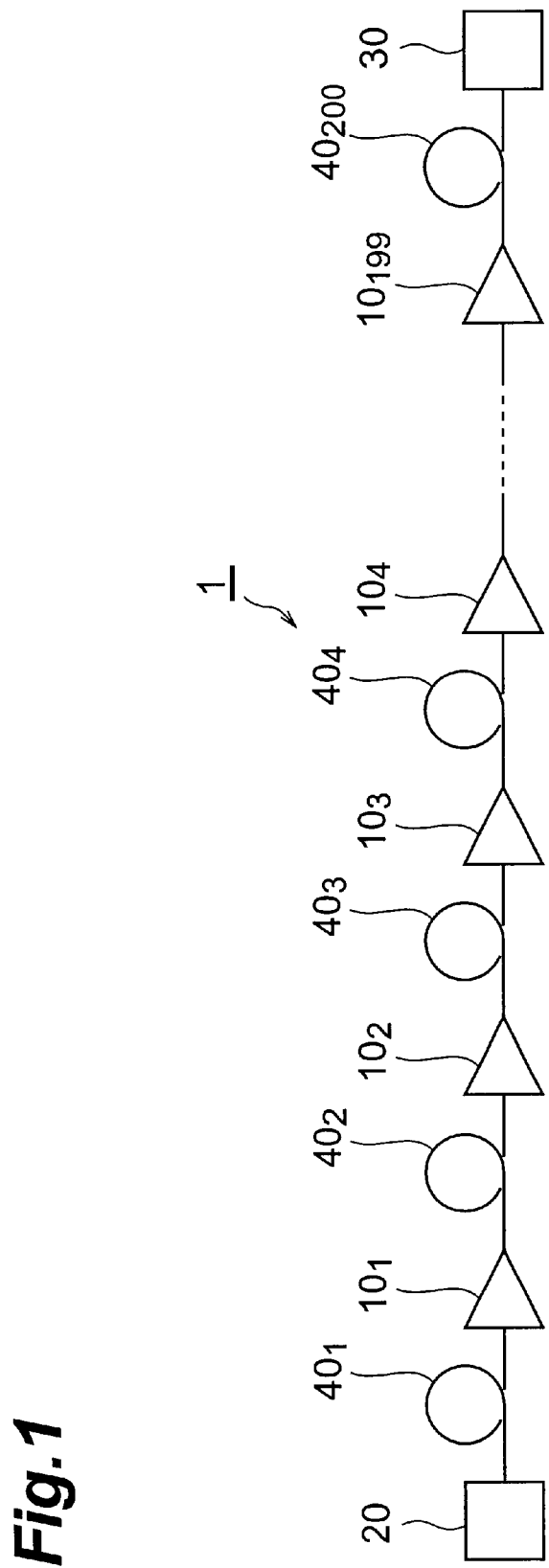
FIG. 1 is a view showing the typical arrangement of an optical communication system according to the present invention.

Each embodiment of an optical amplification fiber, fiber optic amplifier, and optical communication system according to the present invention will be described below in detail with reference to FIGS. 1 to 3, 4A to 4C, 5 to 8, 9A to 9C, and 10 to 12. The same reference numerals denote the same elements throughout the drawings, and a repetitive description thereof will be omitted.

FIG. 1 is a view showing the typical arrangement of an optical communication system according to the present invention. FIG. 1 shows the schematic arrangement of a transpacific optical communication system (including a transmission line of 9000-km length with 200 relay stages each having a relay span of 45-km length) assumed as an optical transmission system 1 according to the present invention. That is, the optical transmission system 1 has fiber optic amplifiers $10_n$ (n=1 to 199) between a transmitter Tx 20 and a receiver Rx 30. The transmitter Tx 20, receiver Rx 30, and fiber optic amplifiers $10_n$ are optically connected through optical fiber transmission lines $40_m$ (m=1 to 200). For example, an optical fiber transmission line $40_1$ of 45-km length is inserted between the transmitter Tx 20 and a fiber optic amplifier $10_1$, an optical fiber transmission line $40_n$ (n=2 to 199) of 45-km length is inserted between a fiber optic amplifier $10_{n-1}$ and the fiber optic amplifier $10_n$, and an optical fiber transmission line $40_{200}$ of 45-km length is inserted between a fiber optic amplifier $10_{199}$ and the receiver Rx 30. Signals that propagate through each optical fiber transmission line $40_m$ has 64 channels (the wavelength band is 1535.82 to 1561.01 nm and the frequency spacing is 50 GHz), and the bit rate per channel is 10 Gbit/s.

Figure 2:
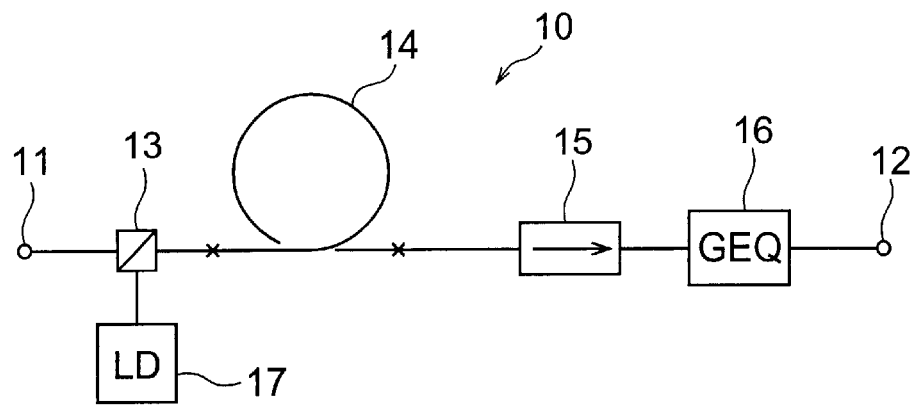
FIG. 2 is a view showing the typical arrangement of a fiber optic amplifier according to the present invention, that is shown in FIG. 1.

A fiber optic amplifier provided in each relay device has a structure as shown in FIG. 2. That is, the fiber optic amplifier 10 has a WDM coupler 13, an Er-doped optical fiber (EDF; Erbium Doped Fiber) 14 serving as an optical amplification fiber, an optical isolator 15, and a gain equalizer 16 sequentially from an input terminal 11 to an output terminal 12. For example, a semiconductor laser source 17 serving as a pumping light source is optically connected to the WDM coupler 13. The absorption peak value in the 1.53-μm wavelength band of the EDF 14 is 46 dB. The wavelength of pumping light output from the pumping light source 17 is 980 nm. Pumping light output from the pumping light source 17 is guided to the EDF 14 through the WDM coupler 13. Multiplexed signals (WDM signals) input from the input terminal 11, which have a plurality of channels in the 1.55-μm wavelength band, is input to the EDF 14 through the WDM coupler 13. The signals amplified by the EDF 14 reach the gain equalizer 16 through the optical isolator 15, gain-equalized by the gain equalizer 16, and externally output from the fiber optic amplifier 10 through the output terminal 12.

The requirements for the signal input/output level and noise figure NF in the fiber optic amplifier 10 shown in FIG. 2 are obtained by the following way. To receive signals without any error, the wavelength resolution must be 0.1 nm, and the optical S/N ratio (OSNR) must be 18 dB or more. The noise figure NF in the fiber optic amplifier 10 is given by the following equation (1).

$$NF = P_{ASE}/(h \cdot v \cdot \Delta v \cdot G) \tag{1}$$

Here, $P_{ASE}$ is the power of spontaneous emission light amplified in the signal wavelength band, h is the Planck constant, v is the signal frequency, $\Delta v$ is the frequency resolution, and G is the gain.

Even when the gain uniformity of the fiber optic amplifier 10 has an ideal value of 0 dB, the relationship between the noise figure NF (dB) and a signal input level $P_{in}$ per channel (dBm/ch) to the fiber optic amplifier 10 is expressed by the following equation (2).

$$NF \leq P_{in} + 17 \tag{2}$$

Note that a margin of about 2 dB is normally assumed in consideration of degradation in signal transmission characteristic due to a nonlinear effect or the like in the optical fiber transmission line between the relay devices. When this margin is assumed, the relationship between the noise figure NF (dB) and the signal input level $P_{in}$ per channel (dBm/ch) is expressed by the following equation (3).

$$NF \leq P_{in} + 15 \tag{3}$$

However, as is known, the noise figure NF of the fiber optic amplifier 10 cannot be smaller than the quantum limit of 3 dB (the following equation (4) holds).

$$NF \geq 3 \tag{4}$$

Hence, the signal input level $P_{in}$ per channel (dBm/ch) must satisfy the following equation (5).

$$P_{in} \geq -12 \tag{5}$$

On the other hand, to reduce degradation in signal waveform due to the nonlinear effect in the optical fiber transmission line between the relay devices, a signal output level $P_{out}$ per channel (dBm/ch) from the fiber optic amplifier 10 preferably satisfies the following equation (6).

$$P_{out} \leq 0 \quad (6)$$

Since the transmission loss of the optical fiber transmission line between the relay devices is 10 to 11 dB, the signal input level $P_{in}$ per channel (dBm/ch) preferably satisfies the following equation (7).

$$P_{in} \leq -11 \quad (7)$$

As described above, the whole signal input level of the 64 channels to the fiber optic amplifier 10 is 6 to 7 dBm.

Figure 3:
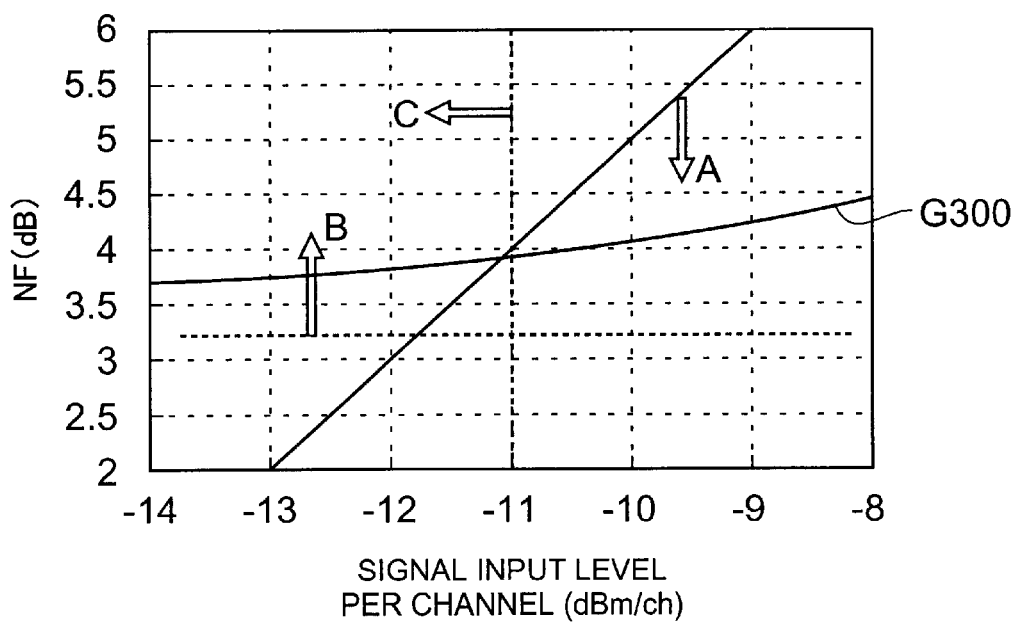
FIG. 3 is a graph showing the allowable range of a noise figure NF.

FIG. 3 is a graph showing the allowable range of the noise figure NF obtained by the above analysis. Referring to FIG. 3, a range indicated by an arrow A is an optical S/N ratio limitation range that is necessary to satisfy the relationship between the noise figure NF and the signal input level $P_{in}$ per channel, which is given by relation (3). A range indicated by an arrow B is the limitation range of the noise figure NF (the quantum limit of the EDF 14) in the fiber optic amplifier 10, which is given by relation (4). For this range, a value of 0.2 dB is added as a loss from the input terminal 11 to the EDF 14. A range indicated by an arrow C is the limitation range of the signal input level $P_{in}$ per channel (the range for limiting the appearance of nonlinearity in the EDF 14), which is given by relation (7). In FIG. 3, a graph G300 represents the relationship between the noise figure NF and the signal input level $P_{in}$ per channel of the EDF 14 in the fiber optic amplifier 10.

As described above, when the limitation range of the noise figure NF shown in FIG. 3 is taken into consideration, the allowable limit of the noise FIG. NF in the EDF 14 must be 4 dB or less.

To make the noise figure NF close to the quantum limit of the EDF 14, the population inversion near the input terminal of the EDF 14 must be 100%. To do this, the wavelength of pumping light to be supplied from the pumping light source 17 to the EDF 14 must be almost 980 nm (975 to 985 nm), and the pumping light power when viewed from Er ions doped into the EDF 14 must be much larger than the signal power.

Figure 4A:
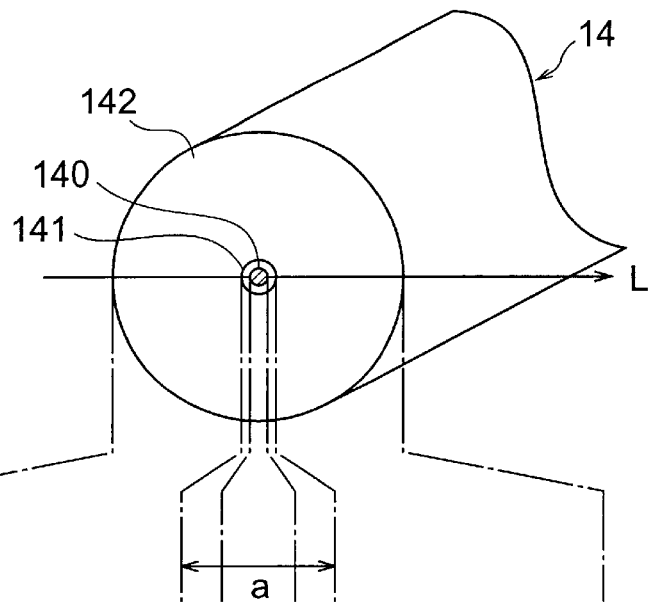
FIG. 4A is a view showing the typical sectional structure of an optical amplification fiber according to the present invention.

FIG. 4A is a view showing the sectional structure of the EDF 14 as an optical amplification fiber according to the present invention. The EDF 14 has a core region 141 having a predetermined refractive index n1 and outer diameter a, and a cladding region 142 provided on the outer periphery of the core region 141 and having a refractive index n2 (<n1). A central region 140 including the optical axis of the core region 141 is doped with erbium (Er) as a rare earth element. The relationship between the pumping light power and signal power when viewed from the Er ions doped into the EDF 14 is determined by the mode field diameter at the signal wavelength in the EDF 14, the mode field diameter at the pumping light wavelength in the EDF 14, and the outer diameter of the Er-doped region 140 in the EDF 14. The Er-doped region 140 has a circular sectional shape centered on the optical axis of the EDF 14, and the Er concentration is uniform in the radial direction of the EDF 14.

Figure 4B:
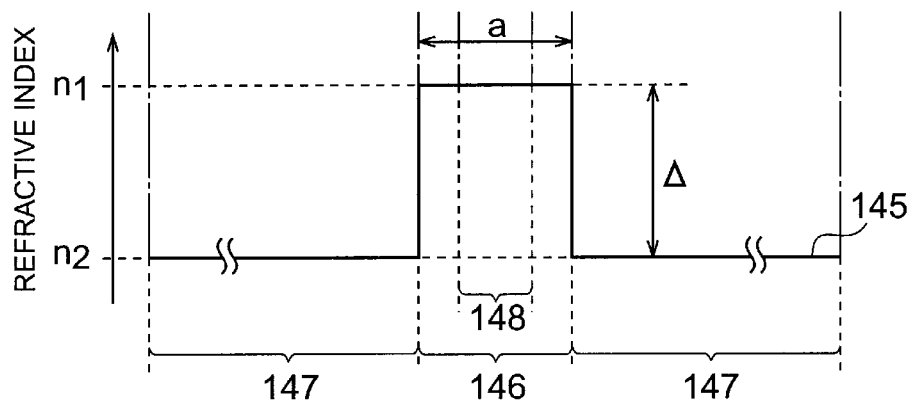
FIG. 4B is a view showing the index profile of the optical amplification fiber shown in FIG. 4A.

FIG. 4B is a view showing the index profile of the EDF 14 shown in FIG. 4A. FIG. 4B shows refractive indices at the respective portions on a line L perpendicular to the optical axis of the EDF 14. In an index profile 145, a region 146 represents refractive indices at the respective portions on a line L1 in the core region 141, a region 147 represents refractive indices at the respective portions on the line L1 in the cladding region 142, and a region 148 represents refractive indices at the respective portions on the line L1 in the Er-doped region 140 (included in the core region 141) doped with Er. A relative refractive index difference Δ of the core region 141 to the cladding region 142 is given by $$\Delta = ((n1)^2 - (n2)^2)/2(n2)^2$$

In this specification, the relative refractive index difference Δ is represented by a percentage, and refractive indices in each equation are not in any specific order.

Figure 4C:
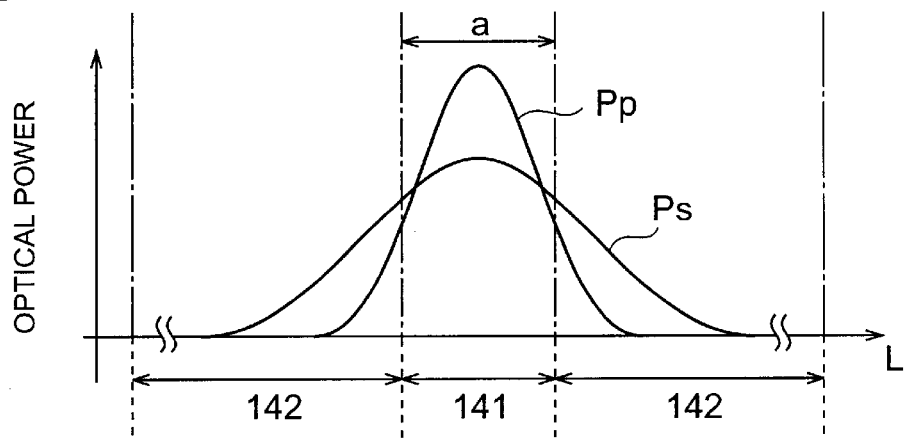
FIG. 4C is a graph showing the optical power distributions of pumping light and a signal which propagate through the optical amplification fiber shown in FIG. 4A.

FIG. 4C is a graph showing the power distributions of pumping light and a signal in the EDF 14 having the above-described structure. As shown in FIG. 4C, according to this EDF 14, the mode field diameter in the pumping light wavelength band and that in the signal wavelength band can be unbalanced.

The three parameters, i.e., the mode field diameter at the signal wavelength and that at the pumping light wavelength in the EDF 14, and the outer diameter of the Er-doped region 140 can be combined in various ways. The present inventors prepared a plurality of samples for each of EDFs of types A to F shown in FIG. 5 and measured the noise figure NF in each of these sample fiber optic amplifiers 10. The signal input level per channel was −11 dBm/ch, and the power of pumping light supplied from the pumping light source 17 to the EDF 14 in the forward direction was 270 mW.

Figures 5, 6:
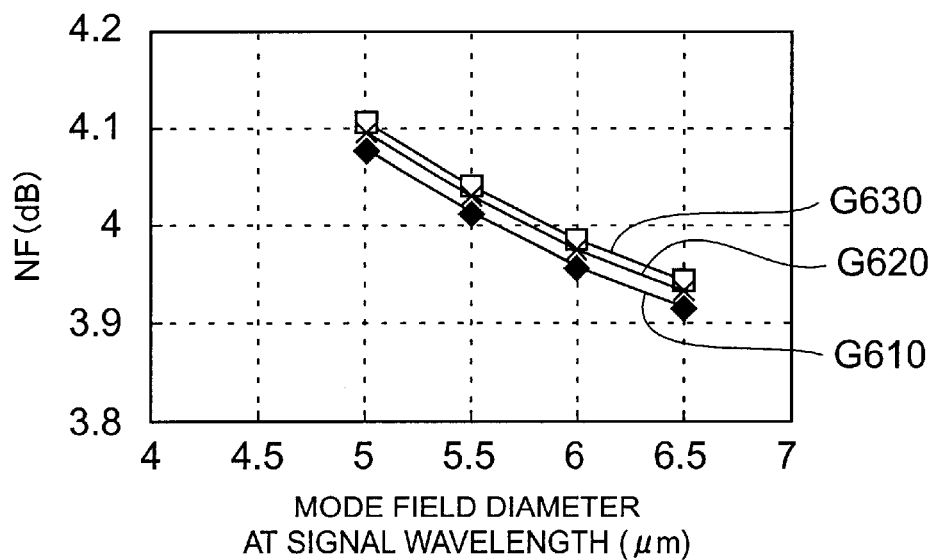
FIG. 5 is a table showing the specifications of eight EDFs of different types as examples of the optical amplification fiber according to the present invention.
FIG. 6 is a graph showing the relationship between the noise figure NF and the mode field diameter at the signal wavelength for each of types A, B, and C of the eight EDFs shown in FIG. 5.

FIG. 6 is a graph showing the relationship between the noise figure NF and the mode field diameter at the signal wavelength for each of EDF samples of types A to C. Referring to FIG. 6, a graph G610 represents the measurement result for an EDF sample of type A, a graph G620 represents the measurement result for an EDF sample of type B, and a graph G630 represents the measurement result for an EDF sample of type C. In each of the EDF samples of types A to C, the mode field diameter at the pumping light wavelength (0.98 μm) is 3.4 μm, and the Er concentration is $1.73 \times 10^{25}$ m$^{-3}$. The outer diameter of the Er-doped region in the EDF sample of type A is 1.6 μm, the outer diameter of the Er-doped region in the EDF sample of type B is 2.0 μm, and the outer diameter of the Er-doped region in the EDF sample of type C is 2.4 μm. In each of the EDF samples of types A to C, the mode field diameter at the signal wavelength (1.53 μm) is 5.0 to 6.5 μm (the EDF samples have mode field diameters of 5.0 μm, 5.5 μm, 6.0 μm, and 6.5 μm and no difference depending on the type). As is apparent from FIG. 6, the larger the mode field diameter at the signal wavelength becomes, the smaller the noise figure NF becomes.

Figure 7:
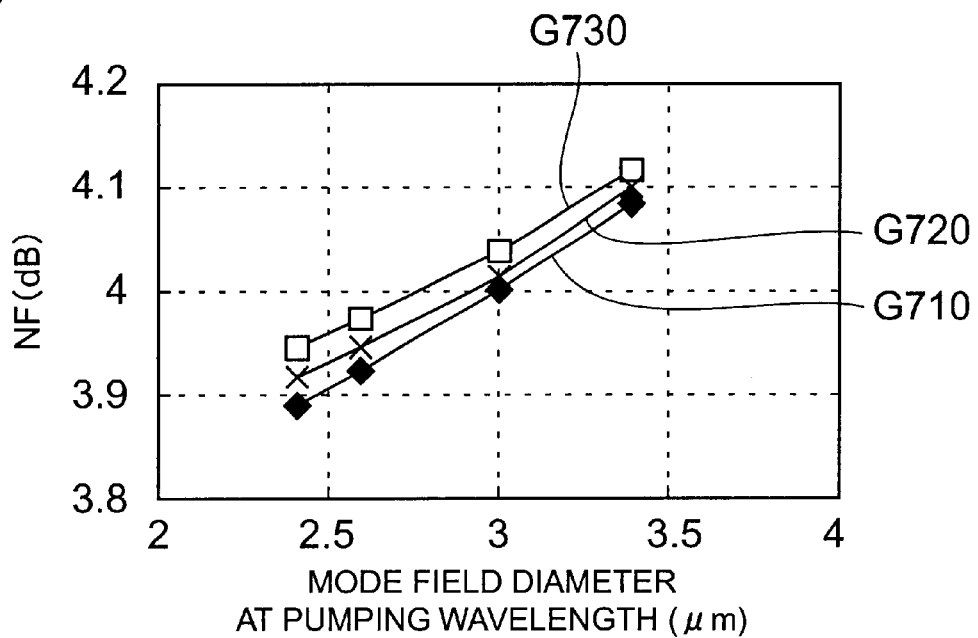
FIG. 7 is a graph showing the relationship between the noise figure NF and the mode field diameter at the pumping light wavelength for each of types D, E, and F of the eight EDFs shown in FIG. 5.

FIG. 7 is a graph showing the relationship between the noise figure NF and the mode field diameter at the pumping light wavelength for each of EDF samples of types D to F. Referring to FIG. 7, a graph G710 represents the measurement result for an EDF sample of type D, a graph G720 represents the measurement result for an EDF sample of type E, and a graph G730 represents the measurement result for an EDF sample of type F. In each of the EDF samples of types D to F, the mode field diameter at the signal wavelength (1.53 μm) is 5.0 μm, and the Er concentration is $1.73 \times 10^{25}$ m$^{-3}$. The outer diameter of the Er-doped region in the EDF sample of type D is 1.6 μm, the outer diameter of the Er-doped region in the EDF sample of type E is 2.0 μm, and the outer diameter of the Er-doped region in the EDF sample of type F is 2.4 μm. In each of the EDF samples of types D to F, the mode field diameter at the pumping light wavelength (0.98 μm) is 2.4 to 3.4 μm (the EDF samples have mode field diameters of 2.4 μm, 2.6 μm, 3.0 μm, and 3.4 μm and no difference depending on the type). As is apparent from FIG. 7, the larger the mode field diameter at the pumping light wavelength becomes, the larger the noise figure NF becomes.

Figure 8:
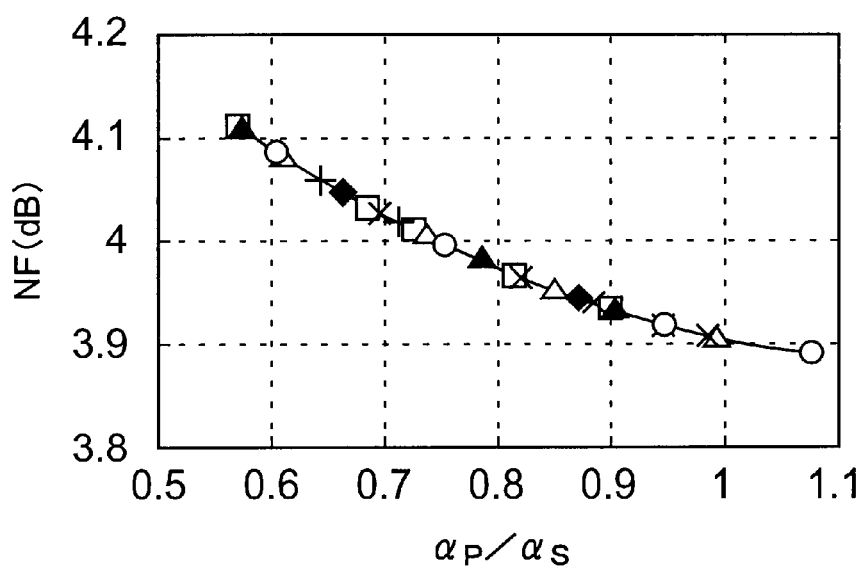
FIG. 8 is a graph showing the relationship between the noise figure NF and the ratio ($\alpha_P/\alpha_S$) of an unsaturated absorption peak value $\alpha_P$ in a pumping light wavelength band (0.98 μm) and an unsaturated absorption peak value $\alpha_S$ in a signal wavelength band (1.53 μm) for each of the types A to H shown in FIG. 5.

FIG. 8 is a graph showing the relationship between the noise figure NF and the ratio ($\alpha_P/\alpha_S$) of an unsaturated absorption peak value $\alpha_P$ at the pumping light wavelength (0.98 μm) and an unsaturated absorption peak value $\alpha_S$ at the signal wavelength (1.53 μm). FIG. 8 shows not only the results for the EDF samples of types A to F but also those for EDF samples of types G and H (to be described later). Referring to FIG. 8, symbol ○ represents the measurement result for the EDF sample of type A, symbol × represents the measurement results for the EDF samples of types B and E, symbol □ represents the measurement result for the EDF sample of type C, symbol Δ represents the measurement result for the EDF sample of type D, symbol ▲ represents the measurement result for the EDF sample of type F, symbol + represents the measurement result for the EDF sample of type G, and symbol ♦ represents the measurement result for the EDF sample of type H.

As shown in FIG. 8, the relationship between the ratio ($\alpha_P/\alpha_S$) and the noise figure NF is appropriately represented by one curve independently of the type. The higher the ratio ($\alpha_P/\alpha_S$) becomes, the smaller the noise figure NF becomes. When the ratio ($\alpha_P/\alpha_S$) is 0.8 or more, the noise figure NF can be suppressed to 4 dB or less. For example, in an EDF sample whose core diameter is 2.0 μm and whose relative refractive index difference Δ between the core region and the cladding region is 2.2%, the mode field diameter at the signal wavelength is 5.0 μm, and the mode field diameter at the pumping light wavelength is 2.6 μm. When the outer diameter of the Er-doped region is 2.4 μm or less, the ratio ($\alpha_P/\alpha_S$) is 0.8 or more.

The signal loss at the input terminal of the EDF 14 in the fiber optic amplifier 10 affects the noise figure NF. Especially, the EDF 14 can hardly be connected to a fiber of different type by fusion, and the variation in connection loss becomes 0.1 dB$_{p-p}$ (i.e., ±0.05 dB) or more. When even such a loss variation generated in the manufacture is taken into consideration, the ratio ($\alpha_P/\alpha_S$) is preferably 0.9 or more. For example, in an EDF sample whose core diameter is 2.6 μm and whose relative refractive index difference Δ between the core region and the cladding region is 1.3%, the mode field diameter at the signal wavelength is 6.5 μm, and the mode field diameter at the pumping light wavelength is 3.4 μm. When the outer diameter of the Er-doped region is 2.4 μm or less, the ratio ($\alpha_P/\alpha_S$) is 0.9 or more.

Figure 9A:
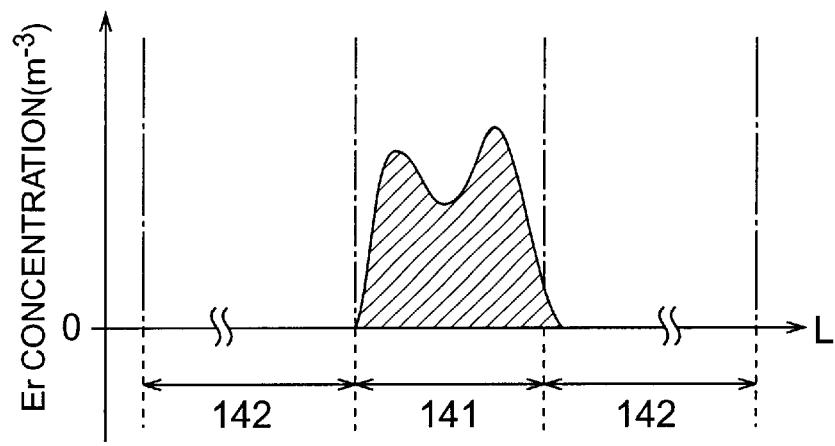
FIGS. 9A to 9C are views for explaining the Er concentration distribution in the optical amplification fiber according to the present invention.
Figure 9B:
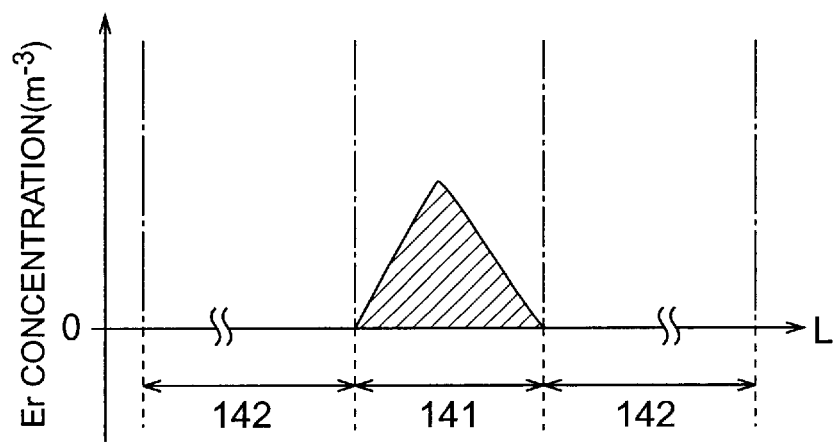
Figure 9C:
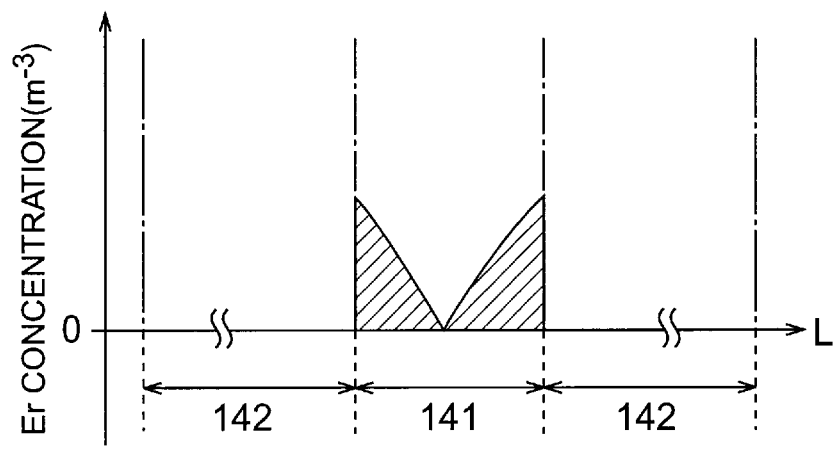

The Er concentration in the part of the core region (Er-doped region) of the EDF is not always uniform. Actually, as shown in FIG. 9A, a peak of Er concentration may be present at a position separated from the optical axis by a predetermined distance. There are an EDF (type G) whose Er concentration increases toward the optical axis, as shown in FIG. 9B, and an EDF (type H) whose Er concentration decreases toward the optical axis, as shown in FIG. 9C. For the EDFs of types G and H, the noise figure NF can hardly be predicted from the mode field diameters at the signal wavelength and at the pumping light wavelength and the distribution of the Er concentration. However, even when the Er concentration is not uniform, as in the EDFs of types G and H, the noise figure NF can easily be obtained from the ratio ($\alpha_P/\alpha_S$). FIG. 5 also shows the specifications of the above-described EDF samples of types G and H. FIG. 8 also shows the relationship between the ratio ($\alpha_P/\alpha_S$) and the noise figure NF for each of the EDF samples of types G and H. As shown in FIG. 8, the relationship between the ratio ($\alpha_P/\alpha_S$) and the noise figure NF is appropriately represented by one curve independently of whether the Er concentration is uniform. Referring to FIG. 8, the EDF sample of type G and the EDF sample of type H are compared. If the outer diameters of the Er-doped regions are the same, the EDF sample of type G whose Er concentration increases toward the optical axis (see FIG. 9B) can have a higher ratio ($\alpha_P/\alpha_S$).

As described above, when the EDF 14 whose ratio ($\alpha_P/\alpha_S$) of the unsaturated absorption peak value $\alpha_P$ at the pumping light wavelength (0.98 μm) to the unsaturated absorption peak value $\alpha_S$ at the signal wavelength (1.53 μm) is 0.8 or more and, more preferably, 0.9 or more is used, the fiber optic amplifier 10 can satisfy the relations (3), (4), and (7). Hence, even in the long-haul optical transmission system 1 in which the distance between the transmitter Tx 20 and the receiver Rx 30 is 9,000 km or more, high-quality communication can be executed using 64 signal channels and a bit rate of 10 Gbit/s.

Structural parameters with which the ratio ($\alpha_P/\alpha_S$) of the unsaturated absorption peak value $\alpha_P$ at the pumping light wavelength (1.05 μm) to the unsaturated absorption peak value $\alpha_S$ at the signal wavelength (1.47 μm) becomes 0.8 or more will be examined next. Three EDF samples whose relative refractive index differences Δ between the core region and the cladding region were 1.0%, 1.5%, and 2.0% were prepared.

Figure 10:
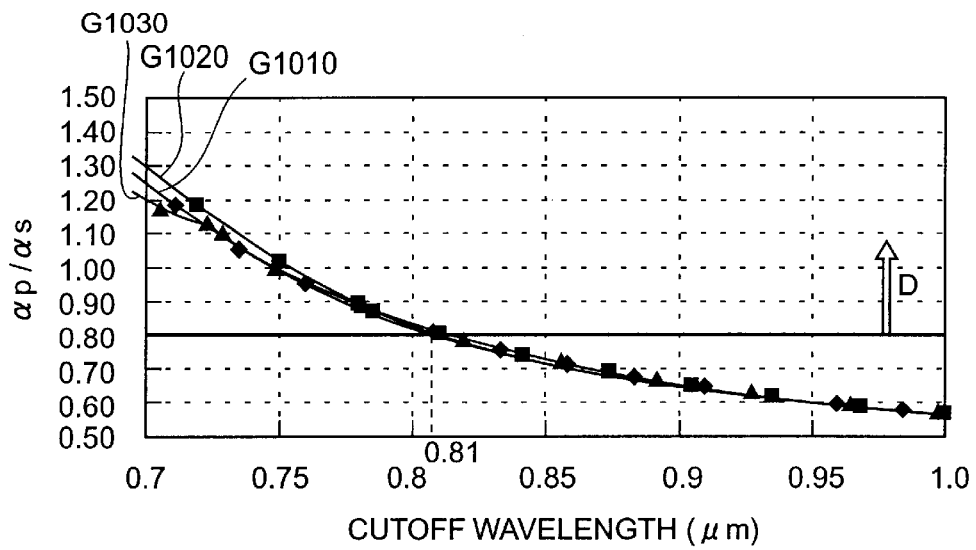
FIG. 10 is a graph showing the relationship between the cutoff wavelength (μm) and the ratio ($\alpha_P/\alpha_S$) of the unsaturated absorption peak value $\alpha_P$ in the pumping light wavelength band (0.98 μm) and the unsaturated absorption peak value $\alpha_S$ in the signal wavelength band (1.53 μm) for each of a plurality of EDFs which have different relative refractive index differences between the core region and the cladding region.

FIG. 10 is a graph showing the relationship between the ratio ($\alpha_P/\alpha_S$) and the cutoff wavelength for each of the EDF samples having different relative refractive index differences. Referring to FIG. 10, a graph G1010 represents the measurement result for the EDF sample with a relative refractive index difference Δ of 1.0%, a graph G1020 represents the measurement result for the EDF sample with a relative refractive index difference Δ of 1.5%, and a graph G1030 represents the measurement result for the EDF sample with a relative refractive index difference Δ of 2.0%. As is apparent from FIG. 10, the ratio ($\alpha_P/\alpha_S$) and cutoff wavelength satisfy a predetermined relationship independently of the difference in relative refractive index difference Δ. Additionally, as is apparent from FIG. 10, to obtain a ratio ($\alpha_P/\alpha_S$) of 0.8 or more (a range indicated by an arrow D in FIG. 10), the cutoff wavelength must be 0.81 μm or less.

Figure 11:
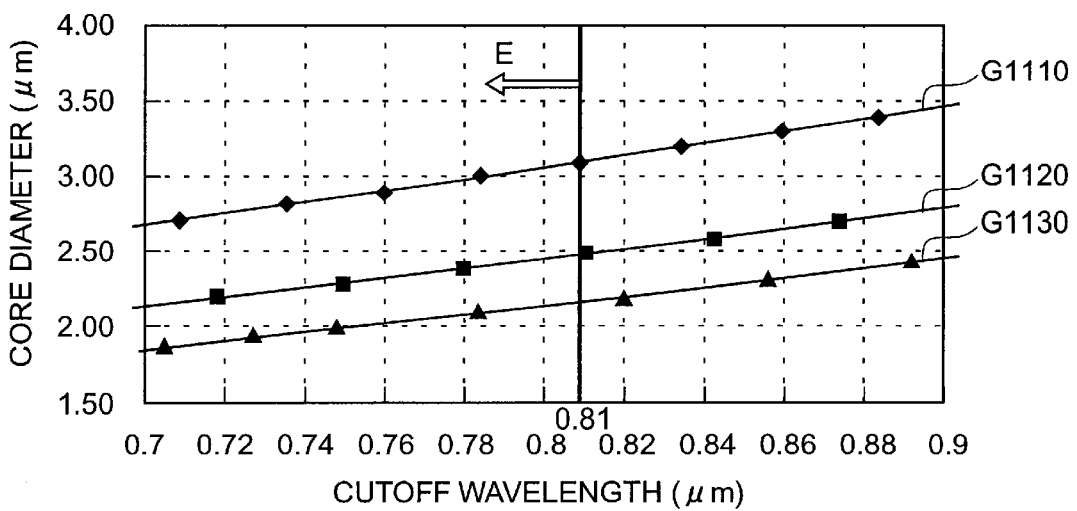
FIG. 11 is a graph showing the relationship between the core diameter (μm) and the cutoff wavelength (μm) for each of the plurality of EDFs which have different relative refractive index differences between the core region and the cladding region.

FIG. 11 is a graph showing the relationship between the outer diameter of the core region and the cutoff wavelength for each of the prepared EDF samples. Referring to FIG. 11, a graph G1110 represents the measurement result for the EDF sample with a relative refractive index difference Δ of 1.0%, a graph G1120 represents the measurement result for the EDF sample with a relative refractive index difference Δ of 1.5%, and a graph G1130 represents the measurement result for the EDF sample with a relative refractive index difference Δ of 2.0%. An arrow E in FIG. 10 indicates the allowable range of the cutoff wavelength derived from the above-described relationship (see FIG. 10). As is apparent from FIG. 11, for the EDF having a relative refractive index difference Δ of 1.0%, the outer diameter of the core region must be 3.1 μm or more. For the EDF having a relative refractive index difference Δ of 1.5%, the outer diameter of the core region must be 2.5 μm or more. For the EDF having a relative refractive index difference Δ of 2.0%, the outer diameter of the core region must be 2.0 μm or more.

Figure 12:
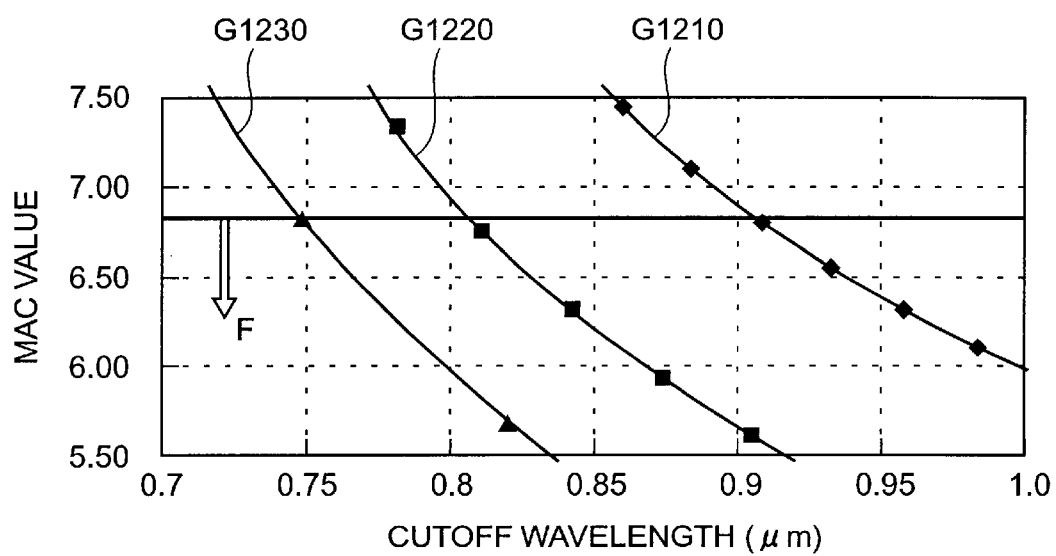
FIG. 12 is a graph showing the relationship between the MAC value and the cutoff wavelength (μm) for each of the plurality of EDFs which have different relative refractive index differences between the core region and the cladding region.

The upper limit of the ratio ($\alpha_P/\alpha_S$) is determined by the bending loss of the EDF. Generally, a MAC value (≡(mode field diameter)/(cutoff wavelength)) used as a bending loss index must be 6.8 or less. FIG. 12 is a graph showing the relationship between the MAC value and the cutoff wavelength for each of the prepared EDF samples. Referring to FIG. 12, a graph G1210 represents the measurement result for the EDF sample with a relative refractive index difference Δ of 1.0%, a graph G1220 represents the measurement result for the EDF sample with a relative refractive index difference Δ of 1.5%, and a graph G1230 represents the measurement result for the EDF sample with a relative refractive index difference Δ of 2.0%. An arrow F in FIG. 12 indicates the allowable range of the MAC value. As is apparent from FIG. 12, for the EDF having a relative refractive index difference Δ of 1.0%, the upper limit value of the ratio ($\alpha_P/\alpha_S$) corresponds to a cutoff wavelength of 0.91 μm. For the EDF having a relative refractive index difference Δ of 1.5%, the upper limit value of the ratio ($\alpha_P/\alpha_S$) corresponds to a cutoff wavelength of 0.81 μm. For the EDF having a relative refractive index difference Δ of 2.0%, the upper limit value of the ratio ($\alpha_P/\alpha_S$) corresponds to a cutoff wavelength of 0.75 μm.

The present invention is not limited to the above-described embodiment, and various changes and modifications can be made. In the above embodiment, the fiber optic amplifier uses, as an optical amplification fiber, an EDF having a light propagating region doped with Er. However, the fiber optic amplifier may use an optical amplification fiber having a light propagating region doped with another rare earth element. Especially, as the optical amplification fiber according to the present invention, a rare-earth-element-doped optical fiber whose pumping light wavelength and signal wavelength are separated by a relatively large amount can be used. For example, a fiber optic amplifier that uses an optical amplification fiber having a light propagating region doped with Tm can exhibit an excellent optical amplification characteristic if the pumping light wavelength is 1.05 μm, the signal wavelength is 1.47 μm, and the ratio ($\alpha_P/\alpha_S$) of the unsaturated absorption peak value $\alpha_P$ at the pumping light wavelength (1.05 μm) to the unsaturated absorption peak value $\alpha_S$ at the signal wavelength (1.47 μm) is 0.8 or more and, more preferably, 0.9 or more.

As described above, in the optical amplification fiber according to the present invention, the ratio ($\alpha_P/\alpha_S$) of the unsaturated absorption peak value $\alpha_P$ in the pumping light wavelength band to the unsaturated absorption peak value $\alpha_S$ in the signal wavelength band is 0.8 or more and, more preferably, 0.9 or more, and a rare earth element is added into the light propagating region such that the concentration increases toward the center of the light propagating region. The fiber optic amplifier according to the present invention has the optical amplification fiber and can exhibit an excellent optical amplification characteristic by suppressing the noise figure NF to 0.4 dB or less. The optical communication system according to the present invention has the fiber optic amplifier and can transmit, through a long haul, signals of a plurality of channels at a high bit rate without any reception error.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplification fiber having a light propagating region whose at least part is doped with a rare earth element, and being capable of amplifying signals by using supplied pumping light,
wherein a ratio ($\alpha_P/\alpha_S$) of an unsaturated absorption peak value $\alpha_P$ in a pumping light wavelength band of 0.98 μm to an unsaturated absorption peak value $\alpha_S$ in a signal wavelength band of 1.53 μm is 0.8 or more.

2. An optical amplification fiber according to claim 1, wherein said ratio ($\alpha_P/\alpha_S$) is 0.9 or more.

3. An optical amplification fiber according to claim 1, wherein said rare earth element is added into the light propagating region of said optical amplification fiber with a concentration thereof increasing toward an optical axis of said optical amplification fiber.

4. A fiber optic amplifier comprising:
an optical amplification fiber according to claim 1; and
a pumping light source for supplying a pumping light to said optical amplification fiber.

5. An optical communication system including a fiber optic amplifier according to claim 4.

6. An optical amplification fiber comprising:
a core region having at least a part doped with a rare earth element and having a predetermined refractive index; and
a cladding region provided on the outer periphery of said core region and having a refractive index lower than that of said core region,
wherein an outer diameter of said core region and a relative refractive index difference between said core region and said cladding region are set so that a ratio ($\alpha_P/\alpha_S$) of an unsaturated absorption peak value $\alpha_P$ in a pumping light wavelength band of 0.98 μm to an unsaturated absorption peak value $\alpha_S$ in a signal wavelength band of 1.53 μm becomes 0.8 or more.

7. An optical amplification fiber according to claim 6, wherein said ratio ($\alpha_P/\alpha_S$) is 0.9 or more.

8. An optical amplification fiber according to claim 6, wherein said rare earth element is added into the light propagating region of said optical amplification fiber with a concentration thereof increasing toward an optical axis of said optical amplification fiber.

9. A fiber optic amplifier comprising:
an optical amplification fiber according to claim 6; and
a pumping light source for supplying a pumping light to said optical amplification fiber.

10. An optical communication system including a fiber optical amplifier according to claim 9.

11. An optical amplification fiber having a Er-doped region, and being capable of amplifying signals by using supplied pumping light,
wherein a ratio ($\alpha_P/\alpha_S$) of an unsaturated absorption peak value $\alpha_P$ in a pumping light wavelength band of 0.98 μm to an unsaturated absorption peak value $\alpha_S$ in a signal wavelength band of 1.53 μm is 0.8 or more, and
wherein said Er-doped region has an outer diameter of 2.4 μm or less.

12. An optical amplification fiber according to claim 11, wherein said optical amplification fiber has a MAC value (=(mode field diameter)/(cutoff wavelength)) of 6.8 or less.

13. An optical amplification fiber having at least propagating region whose at least part is doped with a rare earth element, and being capable of amplifying signals by using supplied pumping light,
wherein a ratio ($\alpha_P/\alpha_S$) of an unsaturated absorption peak value $\alpha_P$ in a pumping light wavelength band of 0.98 μm to an unsaturated absorption peak value $\alpha_S$ in a signal wavelength band of 1.53 μm is 0.8 or more, and
wherein said optical amplification fiber has a value, which is defined by the ratio of mode field diameter at the pumping light wavelength to mode-field diameter at the signal light wavelength, of 0.6 or less.

* * * * *